US011789122B2

(12) United States Patent
Matsuura et al.

(10) Patent No.: US 11,789,122 B2
(45) Date of Patent: Oct. 17, 2023

(54) OMNIDIRECTIONAL DISTANCE MEASURING DEVICE

(71) Applicant: Hitachi-LG Data Storage, Inc., Tokyo (JP)

(72) Inventors: Naoya Matsuura, Tokyo (JP); Norimoto Ichikawa, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 492 days.

(21) Appl. No.: 17/075,832

(22) Filed: Oct. 21, 2020

(65) Prior Publication Data
US 2021/0190917 A1   Jun. 24, 2021

(30) Foreign Application Priority Data

Dec. 23, 2019   (JP) .................................. 2019-231747

(51) Int. Cl.
*G01S 7/48*       (2006.01)
*G01S 7/487*      (2006.01)
*G01S 7/4865*     (2020.01)
*G01S 7/497*      (2006.01)

(52) U.S. Cl.
CPC ............ *G01S 7/4808* (2013.01); *G01S 7/487* (2013.01); *G01S 7/4865* (2013.01); *G01S 7/4972* (2013.01)

(58) Field of Classification Search
USPC ....................................................... 356/5.01
See application file for complete search history.

(56) References Cited

U.S. PATENT DOCUMENTS 7,463,280 B2 * 12/2008 Steuart, III ............ H04N 23/51
                                                              348/42
8,274,550 B2 *  9/2012 Steuart, III .......... H04N 13/246
                                                              348/42
(Continued)

FOREIGN PATENT DOCUMENTS

JP          9-93471 A     4/1997
JP      2007-525054 A     8/2007
(Continued)

OTHER PUBLICATIONS

Japanese Office Action received in corresponding Japanese Application No. 2019-231747 dated Nov. 15, 2022.

*Primary Examiner* — James R Hulka
(74) *Attorney, Agent, or Firm* — MATTINGLY & MALUR, PC (57) ABSTRACT

The present invention provides an omnidirectional distance measuring device that covers a wide detection range and does not require adjustment of each of the detection areas of a plurality of distance measuring sensors. In the omnidirectional distance measuring device, a plurality of distance measuring sensors that measure a distance to a target are disposed radially around a central axis so as to be close to each other. The plurality of distance measuring sensors are integrally configured such that a detection center direction of each of the plurality of distance measuring sensors is inclined by a predetermined angle from a plane perpendicular to the central axis. As the distance measuring sensor, a TOF sensor that measures a distance based on a flight time of light or a stereo camera that measures a distance using parallax of a pair of cameras is used.

6 Claims, 5 Drawing Sheets

(56) References Cited

U.S. PATENT DOCUMENTS

| | | | |
|---|---|---|---|
| 8,659,640 B2* | 2/2014 | Steuart, III | H04N 23/698 348/42 |
| 8,937,640 B2* | 1/2015 | Steuart, III | H04N 13/243 348/36 |
| 9,124,802 B2* | 9/2015 | Steuart, III | H04N 23/51 |
| 9,535,311 B2* | 1/2017 | Bergsten | F16M 13/022 |
| 9,977,128 B2* | 5/2018 | Oberhammer | G01S 7/487 |
| 10,185,211 B2* | 1/2019 | Fukui | G03B 21/2033 |
| 10,838,063 B2* | 11/2020 | Matsuura | G01S 7/4865 |
| 11,245,891 B2* | 2/2022 | Cole | H04N 23/50 |
| 2004/0246333 A1* | 12/2004 | Steuart, III | H04N 13/243 348/42 |
| 2009/0073256 A1* | 3/2009 | Steuart, III | H04N 23/51 348/E7.001 |
| 2010/0165155 A1 | 7/2010 | Chang | |
| 2012/0327185 A1* | 12/2012 | Steuart, III | H04N 13/246 348/36 |
| 2014/0118488 A1* | 5/2014 | Steuart, III | H04N 23/58 348/38 |
| 2015/0177596 A1* | 6/2015 | Bergsten | G03B 17/561 248/205.1 |
| 2015/0207991 A1* | 7/2015 | Steuart, III | G03B 35/08 348/187 |
| 2015/0355330 A1 | 12/2015 | Oberhammer et al. | |
| 2016/0269716 A1 | 9/2016 | Cole et al. | |
| 2018/0259836 A1* | 9/2018 | Fukui | G01S 7/4814 |
| 2018/0302611 A1 | 10/2018 | Baak et al. | |
| 2019/0011560 A1* | 1/2019 | Matsuura | G01S 7/4865 |
| 2019/0120966 A1* | 4/2019 | Kimura | G01S 7/4813 |
| 2021/0356593 A1* | 11/2021 | Hayashi | G01S 7/51 |

FOREIGN PATENT DOCUMENTS

| | | |
|---|---|---|
| JP | 2008-281427 A | 11/2008 |
| JP | 2015-119476 A | 6/2015 |
| JP | 2016-502657 A | 1/2016 |
| JP | 2018-146525 A | 9/2018 |

* cited by examiner

FIG. 1A

TOF SENSOR 10

FIG. 1B

OMNIDIRECTIONAL DISTANCE MEASURING DEVICE 1

FIG. 2A

A-A CROSS SECTION

FIG. 2B

ATTACHMENT AND DETACHMENT WORK

FIG. 6A
PRESENT EMBODIMENT

FIG. 6B
COMPARATIVE EXAMPLE

FIG. 6C
COMPARATIVE EXAMPLE

QUADRILATERAL ARRANGEMENT

FIG. 10C

PROXIMITY ARRANGEMENT

FIG. 11

OMNIDIRECTIONAL DISTANCE MEASURING DEVICE

CLAIM OF PRIORITY

The present application claims priority from Japanese patent application serial No. JP 2019-231747, filed on Dec. 23, 2019, the content of which is hereby incorporated by reference into this application.

BACKGROUND OF THE INVENTION

(1) Field of the Invention

The present invention relates to an omnidirectional distance measuring device that measures a distance to a target in all directions.

(2) Description of the Related Art

In order to measure a distance to a target and obtain a distance image, a distance measuring device using a method (TOF=Time Of Flight) of measuring the distance based on the flight time until irradiation light is reflected by the object and returns has been put into practice. In this case, a TOF sensor, which is a distance measuring sensor, periodically repeats the emission of irradiation light and the exposure of reflected light and calculates the time delay of the reflected light with respect to the irradiation light from the amount of exposure accumulated in a predetermined exposure period to measure the distance. When the measurement space is large, a plurality of TOF sensors are installed in the same measurement space to perform their distance measurement operations at the same time. For example, JP 2016-502657 A discloses determination of optical interference between devices and measures against interference when a plurality of TOF sensors are installed.

SUMMARY OF THE INVENTION

A general distance measuring sensor has a limited detection area (detection angle width). For example, when a distance measuring sensor is mounted on the ceiling of a room to detect an area directly below the distance measuring sensor, the detection range is limited to the area directly below the distance measuring sensor. Therefore, in order to cover a larger space (all directions), a plurality of distance measuring sensors are installed to expand the detection area. In this case, it is desirable to install the distance measuring sensors efficiently so that the overlapping between the detection areas of the distance measuring sensors is reduced and there is no undetected area. For this reason, the operator has to install a plurality of distance measuring sensors on the ceiling or the like and then adjust the detection area for each distance measuring sensor, which causes a problem that the working time and the installation cost increase.

In known techniques including JP 2016-502657 A, there is no particular consideration for the distance measuring device for covering the large space and the work efficiency when installing a plurality of distance measuring sensors.

It is an object of the invention to provide an omnidirectional distance measuring device that covers a wide detection range and does not require adjustment of each of the detection areas of a plurality of distance measuring sensors.

An omnidirectional distance measuring device of the invention includes: a plurality of distance measuring sensors that measure a distance to a target and are disposed radially around a central axis so as to be close to each other. The plurality of distance measuring sensors are integrally configured such that a detection center direction of each of the plurality of distance measuring sensors is inclined by a predetermined angle from a plane perpendicular to the central axis.

Preferably, the distance measuring sensor is a time of flight (TOF) sensor that measures a distance to a target based on a flight time of light, and the TOF sensor includes a light emitting unit that emits irradiation light and a light receiving unit that receives reflected light from a target. In addition, the light emitting units of the plurality of TOF sensors are disposed radially around the central axis so as to be close to each other, and the light receiving units of the plurality of TOF sensors are shared and are disposed in a central portion of the omnidirectional distance measuring device. Alternatively, the distance measuring sensor is a stereo camera that measures a distance to a target using parallax of a pair of cameras.

According to the omnidirectional distance measuring device of the invention, a wide detection range is covered, and it is not necessary to adjust the detection areas of a plurality of distance measuring sensors when installing the device. Therefore, it is possible to reduce the working time and the installation cost.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE EMBODIMENT

Hereinafter, an embodiment of the invention will be described. Although the invention uses a plurality of distance measuring sensors, a case where a TOF sensor is used as a distance measuring sensor will be described in first and second embodiments, and a case where a stereo camera is used as a distance measuring sensor will be described in a third embodiment.

First Embodiment

Figure 1A:
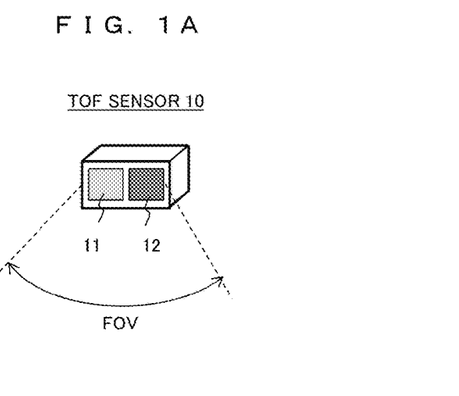
FIGS. 1A and 1B are diagrams illustrating the appearance of an omnidirectional distance measuring device according to a first embodiment.
Figure 1B:
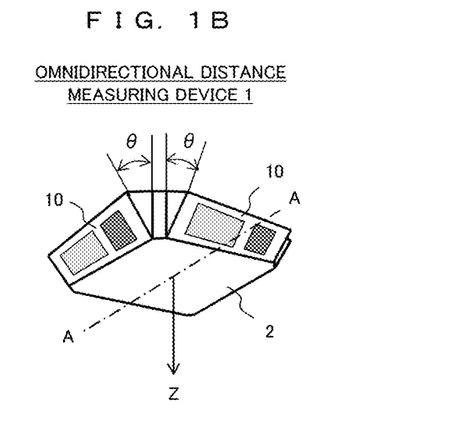

FIGS. 1A and 1B are diagrams illustrating the appearance of an omnidirectional distance measuring device 1 according to the first embodiment. In the first embodiment, a TOF sensor is used as a distance measuring sensor. FIG. 1A illustrates a TOF sensor 10 alone, and FIG. 1B illustrates the entire omnidirectional distance measuring device 1.

The omnidirectional distance measuring device 1 is configured by integrally forming a plurality of TOF sensors 10, and can measure the distance to a target in the detection area in all directions. In this example, four TOF sensors 10 are disposed radially around the Z axis, which is the central axis, so as to be close to each other, and are fixed with a housing 2. That is, the long sides of the four TOF sensors 10 form four sides of a quadrangle. In addition, the number of TOF sensors 10 is not limited to this, but may be any number. As the number of TOF sensors 10 increases, the outer shape becomes an approximately circular shape.

In each TOF sensor 10, a light emitting unit 11 that emits laser light and a light receiving unit 12 that receives reflected light from the target are disposed side by side. The emission direction of the light emitting unit 11 and the receiving direction of the light receiving unit 12 are approximately the same, and each of these has a predetermined angle width. Hereinafter, this angle width will be referred to as a field of view (FOV), and becomes the detection area of the TOF sensor.

When integrating the TOF sensors 10 in the omnidirectional distance measuring device 1, the posture of each TOF sensor 10 is determined so that the overlapping of the detection areas of the TOF sensors 10 is reduced and there is no undetected area. For example, when the omnidirectional distance measuring device 1 is mounted on the ceiling to detect all directions in the room, each TOF sensor 10 is installed such that the center direction (hereinafter, referred to as a detection center direction) of the detection area of each TOF sensor 10 is inclined by a predetermined angle θ downward from a plane (that is, a horizontal plane) perpendicular to the Z axis that is the central axis.

Figure 2A:
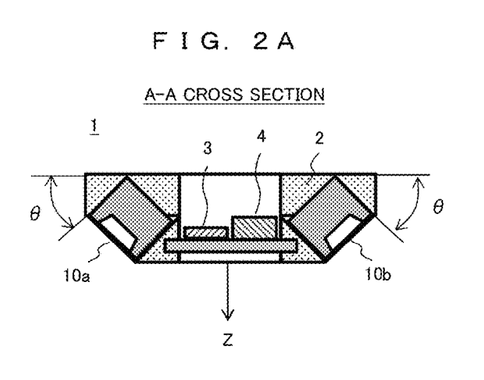
FIGS. 2A and 2B are cross-sectional views of the omnidirectional distance measuring device illustrated in FIG. 1.

FIGS. 2A and 2B are cross-sectional views of the omnidirectional distance measuring device 1. FIG. 2A illustrates the cross-sectional shape of the A-A position in FIG. 1B. TOF sensors 10a and 10b are held at predetermined positions by the housing 2 and integrated. The housing 2 has a storage chamber for holding the TOF sensors 10a and 10b. Therefore, the TOF sensors 10a and 10b facing each other can be held at predetermined intervals and at postures where the detection center direction is inclined by the angle θ from the horizontal plane.

In addition, a common data processing unit 3 for performing signal processing of each TOF sensor 10 and a power supply unit 4 for supplying electric power to each TOF sensor 10 are disposed in the space between the TOF sensors 10a and 10b facing each other. Therefore, since it is possible to effectively use the space inside the device, it is possible to reduce the size of the device. In addition, since the distances from the respective TOF sensors 10 to the data processing unit 3 are made equal, the variation of each sensor is reduced. This improves the performance of the device.

Figure 2B:
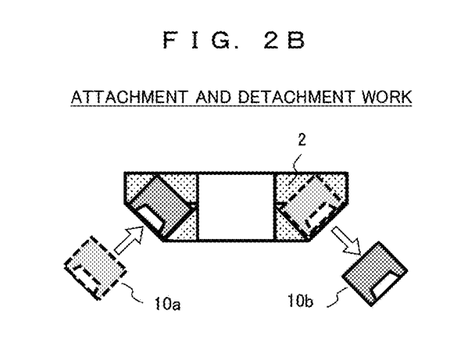

FIG. 2B illustrates how the TOF sensors 10a and 10b are attached to and detached from the housing 2. Each TOF sensor 10 can be separately attached to and detached from the storage chamber of the housing 2. This is efficient because an unnecessary sensor can be removed depending on the size of the measurement area or only a faulty sensor can be replaced individually. In addition, since each TOF sensor 10 is positioned in contact with the storage chamber of the housing 2, the position or posture of each TOF sensor 10 is not changed even if the TOF sensor 10 is attached or detached. Therefore, it is possible to maintain the measurement accuracy of the omnidirectional distance measuring device 1.

Figure 3:
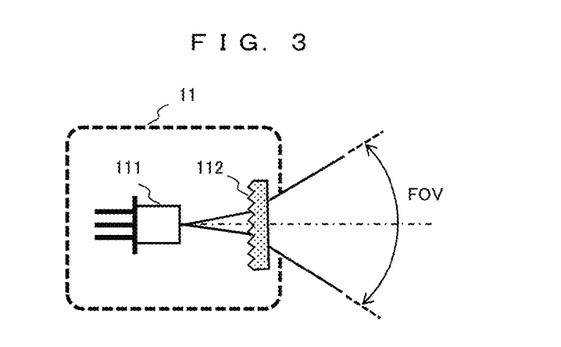
FIG. 3 is a diagram illustrating the configuration of a light emitting unit.

FIG. 3 is a diagram illustrating the configuration of the light emitting unit 11. As the light emitting unit 11, a light source 111, such as a laser diode (LD), is used. However, since the spread (divergence angle) of the emitted beam is very narrow, the field of view (FOV) of the distance measuring sensor is narrow. Therefore, the divergence angle is increased using a diffusion plate 112 to obtain the desired FOV. In the diffusion plate 112, minute lenses are randomly formed on the incidence surface, for example. Therefore, by changing the shape of the minute lens, the desired FOV can be obtained. In addition, since the magnitude of the FOV and the detection distance in the TOF sensor are in conflict with each other, the FOV is determined by balancing the two.

In the omnidirectional distance measuring device 1 of this example, four TOF sensors 10 are combined. Therefore, by setting the FOV of one TOF sensor 10 to 90, it is possible to cover the field of view of 360 (all directions) by connecting the four TOF sensors 10 to each other. That is, the number of TOF sensors to be used is set such that the sum of FOVs is approximately the same as an angle corresponding to the measurement area. This configuration is most efficient when the measurement space is the inside of a room or the like and the area to be detected has a quadrangular shape. In addition, assuming that the FOV of one TOF sensor 10 is 60, it is possible to cover the field of view of 360 (all directions) by combining six TOF sensors 10. In other words, the number of TOF sensors 10 used in the omnidirectional distance measuring device 1 can be changed by selecting the characteristics (divergence angle) of the diffusion plate 112.

Figure 4:
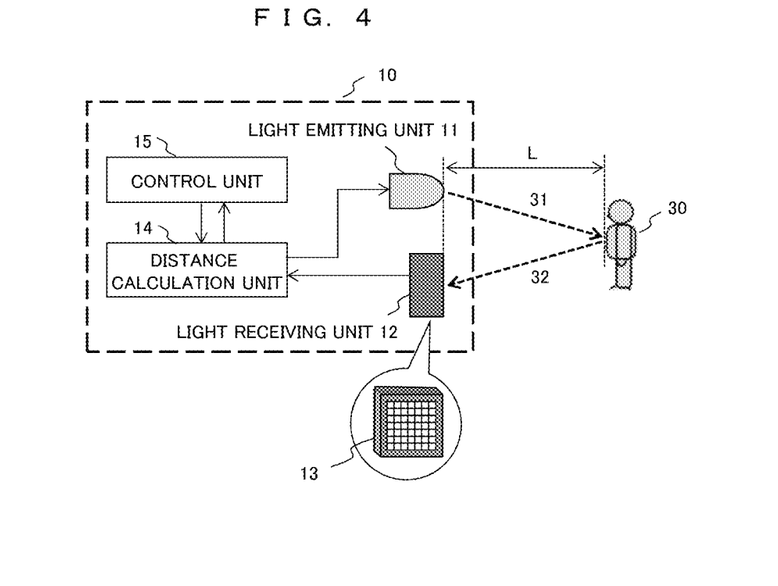
FIG. 4 is a diagram illustrating the distance measurement principle of a TOF sensor.

FIG. 4 is a diagram illustrating the distance measurement principle of a TOF sensor. The TOF sensor 10 measures a distance to a measurement target 30, such as a person or an object, and outputs the measured distance to each portion of the target as two-dimensional distance data. This configuration includes the light emitting unit 11, the light receiving unit 12, a distance calculation unit 14, and a control unit 15.

The light emitting unit 11 drives a light source, such as a laser diode (LD), to emit pulsed irradiation light 31, such as a laser. The light receiving unit 12 detects pulsed reflected light 32 when the irradiation light 31 is reflected by the target 30 and returns. The light receiving unit 12 performs exposure with an image sensor 13 in which CCD sensors or CMOS sensors are arranged in a two-dimensional manner, and converts the light intensity at each pixel position into an electrical signal.

The distance calculation unit 14 calculates a distance L from the output signal from the light receiving unit 12 to the target 30, and generates distance data in the field of view. In the calculation of the distance L, the distance L to the target 30 can be calculated by $L = dT \times c/2$ (here, c is the speed of light) based on a time difference dT between the irradiation light 31 and the reflected light 32. In addition, the time difference dT can be calculated by setting a plurality of exposure periods and using the amount of charge accumulated in the image sensor 13 during the exposure periods.

The control unit 15 controls the emission operation of the irradiation light 31 from the light emitting unit 11 and the exposure operation of the reflected light 32 at the light receiving unit 12 through distance calculation unit 14.

Figure 5:
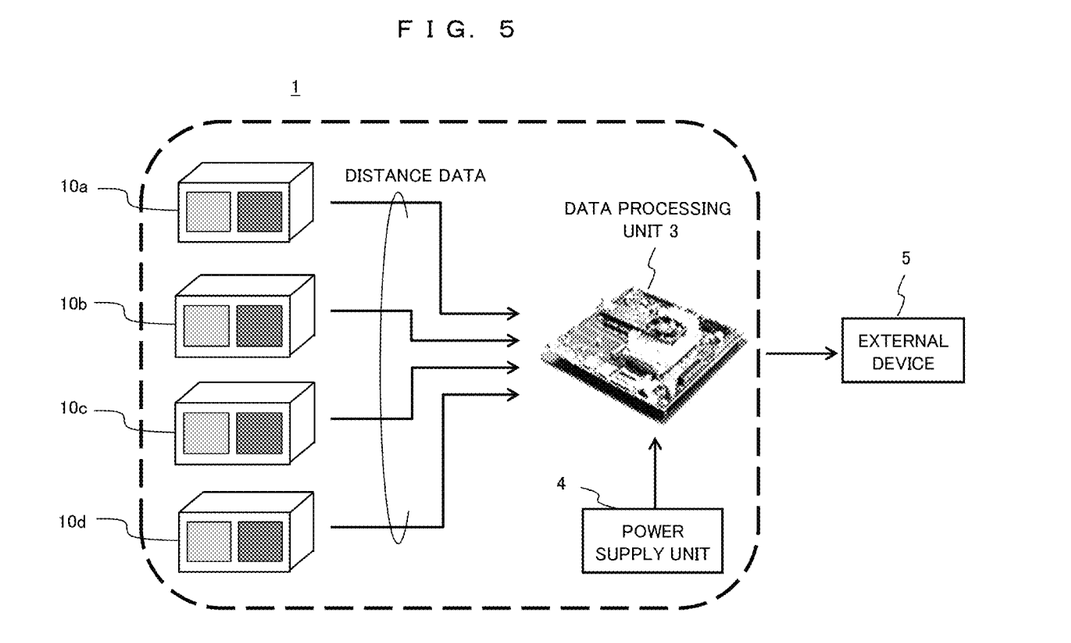
FIG. 5 is a diagram describing signal processing from TOF sensors.

FIG. 5 is a diagram describing signal processing from the TOF sensor 10. Here, the case of four TOF sensors 10a to 10d is illustrated. In order to avoid interference (such as multipath) between a plurality of TOF sensors at the time of measurement, the TOF sensors are made to operate in different emission patterns. The distance data measured by each TOF sensor is transmitted to the data processing unit 3.

The data processing unit 3 is configured by a system on a chip (SoC), and combines the distance data of the respective TOF sensors by coordinate conversion and outputs the combined distance data as data of one common coordinate system. In addition, it is possible to convert the distance data into image data that is color-coded according to the distance value. In addition, it is possible to perform processing for determining an object from the distance data and outputting only specific data. Therefore, for example, it is possible to calculate the number of visitors per day in a store and output only the value.

Data obtained by the processing in the data processing unit 3 is transmitted to an external device 5 (a cloud or a server) and appropriately displayed and stored. As described above, since the power supply unit 4 and the data processing unit 3 for signal processing of each TOF sensor are shared, data processing efficiency and cost reduction can be achieved.

Figure 6A:
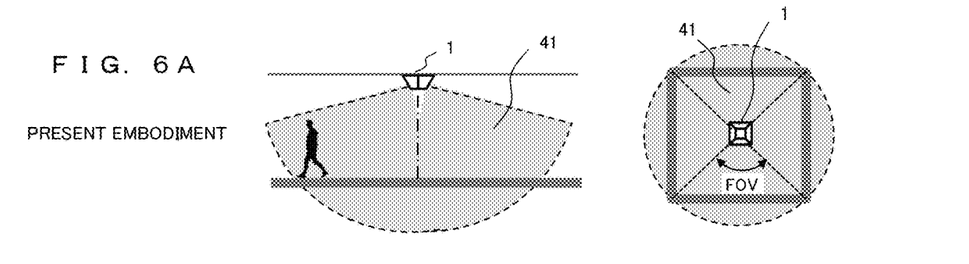
FIGS. 6A to 6C are diagrams illustrating examples of the detection range by the omnidirectional distance measuring device.
Figure 6B:
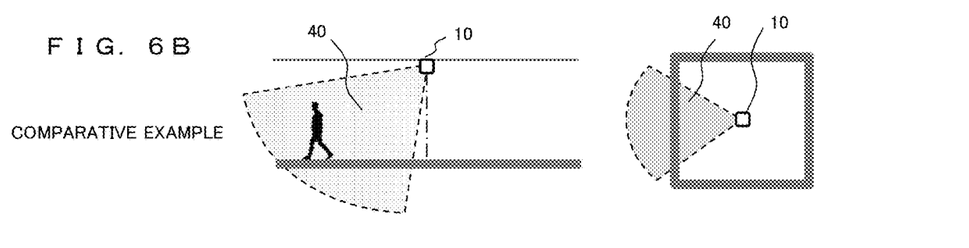
Figure 6C:
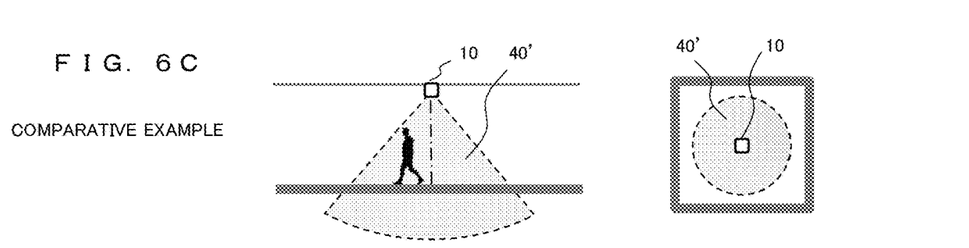

FIGS. 6A to 6C are diagrams illustrating examples of the detection range by the omnidirectional distance measuring device 1. FIG. 6A illustrates the case of the omnidirectional distance measuring device 1, and FIGS. 6B and 6C illustrate cases of one TOF sensor 10 for comparison. The left side in each diagram is a side view of the measurement space when viewed in a horizontal direction, and the right side in each diagram is a plan view of the measurement space when viewed in a vertical direction.

FIG. 6A illustrates a case where the omnidirectional distance measuring device 1 (formed by four TOF sensors 10) illustrated in FIG. 1B is installed on the ceiling, and a detection range 41 that is wide in the horizontal direction can be obtained. As a result of setting the FOV of one TOF sensor 10 to 90 and combining the four TOF sensors 10, omnidirectional (360) measurement becomes possible without adjustment.

On the other hand, FIGS. 6B and 6C illustrate cases where one TOF sensor 10 is installed on the ceiling. FIG. 6B illustrates a case where the viewing direction is set diagonally. In this case, a detection range 40 is narrow and limited to one direction of the measurement space (left side in the diagram). FIG. 6C illustrates a case where the viewing direction is set to a downward direction. In this case, a detection range 40' is narrow and limited to the area directly below the TOF sensor 10.

Thus, according to the omnidirectional distance measuring device 1 of the present embodiment, it is possible to cover a wide detection range without adjusting the detection areas of a plurality of TOF sensors.

Figure 7:
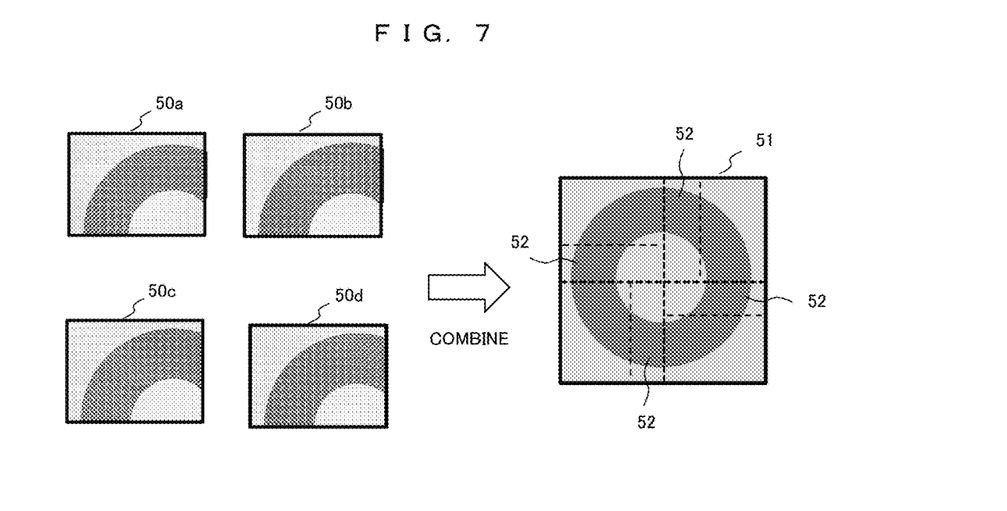
FIG. 7 is a diagram schematically illustrating an example of a distance image.

FIG. 7 is a diagram schematically illustrating an example of a distance image obtained by the omnidirectional distance measuring device 1. This is a case where distance data obtained from the four TOF sensors 10a to 10d is converted into a distance image by the data processing unit 3. Each of distance images 50a to 50d obtained from the TOF sensors 10a to 10d is a partial image of ¼ area of the total measurement space.

By connecting the partial images 50a to 50d in overlap regions 52 to combine these by the data processing unit 3, it is possible to generate one omnidirectional distance image 51. Due to the optimal arrangement of the TOF sensors 10a to 10d, in the distance image 51 after the combination, the overlap region 52 is small, and no gap occurs between adjacent images.

As described above, according to the first embodiment, a wide detection range can be covered by using an omnidirectional distance measuring device that is formed by integrating a plurality of TOF sensors. In addition, it is not necessary to adjust the detection areas of the plurality of TOF sensors. Therefore, when installing the omnidirectional distance measuring device of the present embodiment at a measurement site, it is possible to reduce the working time and the installation cost by eliminating the work, such as posture adjustment performed at the time of installation.

Second Embodiment

The second embodiment is a case where light receiving units of a plurality of TOF sensors are shared.

Figure 8A:
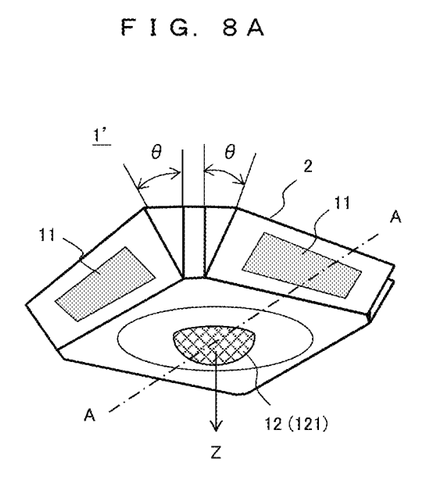
FIGS. 8A and 8B are diagrams illustrating the appearance of an omnidirectional distance measuring device according to a second embodiment.
Figure 8B:
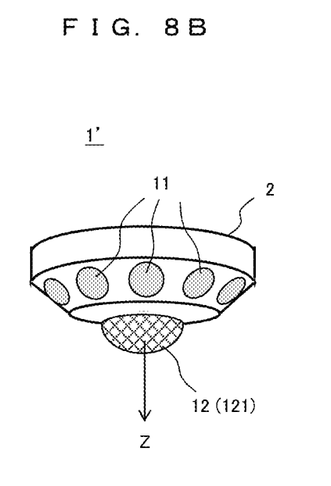

FIGS. 8A and 8B are diagrams illustrating the appearance of an omnidirectional distance measuring device 1' according to the second embodiment. As in the first embodiment, TOF sensors are used as distance measuring sensors, but the light receiving units of the TOF sensors are shared. Here, two types are illustrated. FIG. 8A is a quadrangle type and FIG. 8B is a circle type. Reference numerals in the diagrams are assigned as in the first embodiment.

In the omnidirectional distance measuring device 1' illustrated in FIG. 8A, four light emitting units 11 are disposed on four sides of the housing 2 so that irradiation light is emitted in all directions. A common light receiving unit 12 is disposed at the center of the bottom surface of the housing 2 so that reflected light from all directions is received. In addition, a fisheye lens 121 is disposed at the incidence position of the light receiving unit 12, so that reflected light from each direction can be collected in one place. The field of view (FOV) in the present embodiment is determined by the emission direction of each light emitting unit 11, and the four light emitting units 11 are installed such that the emission center direction of each light emitting unit 11 is inclined by the angle θ downward from the horizontal plane as in the first embodiment (FIG. 1).

In the omnidirectional distance measuring device 1' illustrated in FIG. 8B, a plurality of light emitting units 11 are disposed at equal intervals on the circumference of the approximately circular housing 2 to emit irradiation light in all directions. The light receiving unit 12 is the same as that in the configuration in FIG. 8A.

Figure 9:
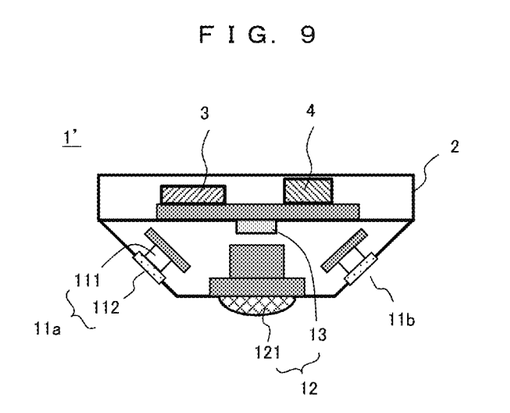
FIG. 9 is a cross-sectional view of the omnidirectional distance measuring device illustrated in FIG. 8.

FIG. 9 is a cross-sectional view of the omnidirectional distance measuring device 1', and illustrates the cross-sectional shape of the A-A position in FIG. 8A. Light emitting units 11a and 11b facing each other and the common light receiving unit 12 are held by the housing 2. Each of the light emitting units 11a and 11b has the light source 111 and the diffusion plate 112, and the light receiving unit 12 has the image sensor 13 and the fisheye lens 121. The data processing unit 3 and the power supply unit 4 are disposed on the top surface side of the housing 2. Unlike in the first embodiment, the light emitting timings of the light emitting units 11a and 11b are the same, and are set with the exposure timing of the image sensor 13 as a reference.

According to the second embodiment, since the light receiving units of a plurality of TOF sensors are shared and integrated in one place, it is possible to further reduce the size and cost of the omnidirectional distance measuring device.

Third Embodiment

The third embodiment is a case where a stereo camera is used as a distance measuring sensor. The stereo camera can also measure the distance similarly to the TOF sensor.

Figure 10A:
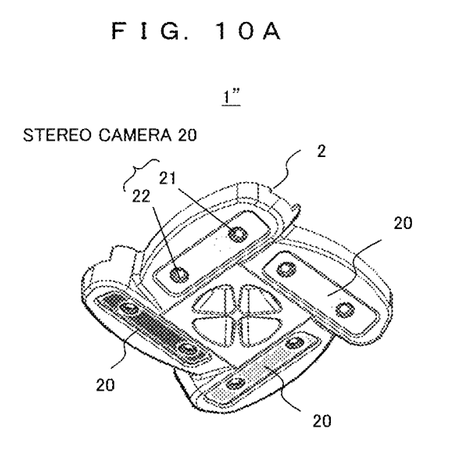
FIGS. 10A to 10C are diagrams illustrating the appearance of an omnidirectional distance measuring device according to a third embodiment.
Figure 10B:
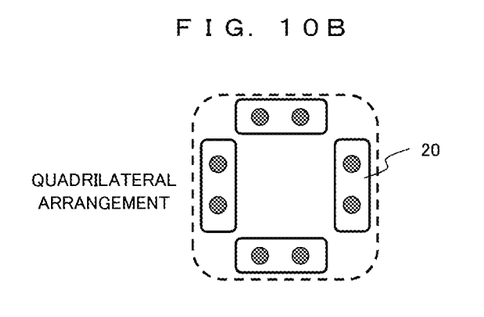
Figure 10C:
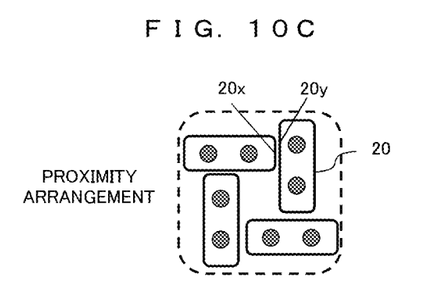

FIGS. 10A to 10C are diagrams illustrating the appearance of an omnidirectional distance measuring device according to the third embodiment. FIG. 10A is an external perspective view, and FIGS. 10B and 10C are plan views illustrating an arrangement example of a plurality of stereo cameras.

An omnidirectional distance measuring device 1" illustrated in FIG. 10A is configured by integrally forming a plurality of stereo cameras 20. In this example, four stereo cameras 20 are disposed radially on the four sides of a quadrangle so as to be close to each other, and are held by the housing 2. In each stereo camera 20, a pair of cameras 21 and 22 are disposed side by side to measure the distance to an object in front by the principle of triangulation. Each stereo camera 20 has a longitudinal shape in a direction in which the pair of cameras 21 and 22 are arranged.

Here, in the stereo camera 20 adopted in the present embodiment, the field of view (FOV) in the longitudinal direction is larger than the FOV in the lateral direction perpendicular thereto. Therefore, the plurality of stereo cameras 20 are disposed such that their lateral directions are radial. These configurations enable measurement in all directions. The number of stereo cameras 20 to be used and the posture (inclination from the horizontal direction) of each stereo camera 20 are determined according to the detection center direction and the FOV of the stereo cameras 20 to be used, similarly to the TOF sensor 10 in the first embodiment.

FIGS. 10B and 10C are arrangement examples when four stereo cameras 20 are used. FIG. 10B is a quadrilateral arrangement in which the longitudinal direction of each stereo camera 20 matches each side of a quadrangle. In FIG. 10C, the stereo cameras 20 in FIG. 10B are disposed closer to each other, and an end portion 20x of one stereo camera is disposed close to a longitudinal side surface 20y of an adjacent stereo camera. Therefore, in the proximity arrangement illustrated in FIG. 10C, stereo cameras are closer to each other than in the quadrilateral arrangement illustrated in FIG. 10B. As a result, since the total area occupied by the stereo cameras and the central portion surrounded by the stereo cameras is small, it is possible to further reduce the size of the omnidirectional distance measuring device 1".

Although a case where the four stereo cameras 20 are used has been described herein, the number of stereo cameras 20 is not limited to this. When the number of stereo cameras is increased in the proximity arrangement illustrated in FIG. 10C, the stereo cameras 20 are sequentially disposed such that an end portion of one stereo camera 20 is close to the longitudinal side surface of another stereo camera 20, and are disposed such that an approximately circular shape is obtained as a whole.

In addition, the cross section of the omnidirectional distance measuring device 1" of the present embodiment has the same configuration as that in the first embodiment (FIG. 2). The common data processing unit 3 for performing signal processing of each stereo camera 20 or the common power supply unit 4 is disposed in a central space inside the omnidirectional distance measuring device 1", and each stereo camera 20 is attachable to and detachable from the housing 2.

Figure 11:
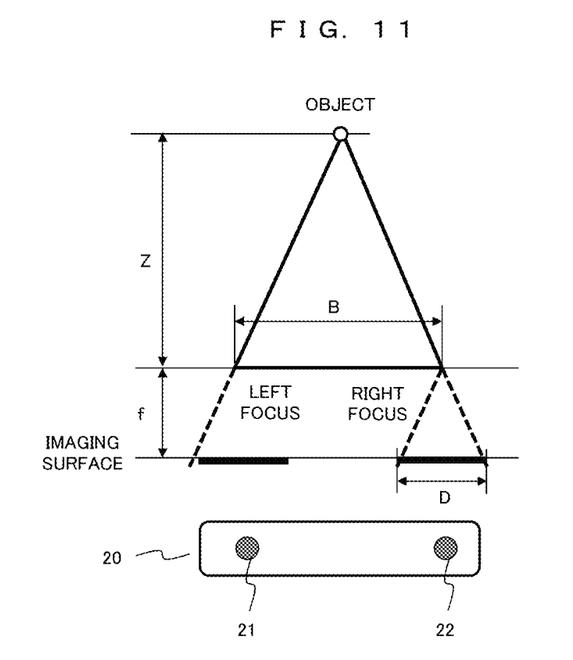
FIG. 11 is a diagram illustrating the principle of distance measurement using a stereo camera.

FIG. 11 is a diagram illustrating the principle of distance measurement using a stereo camera. On the imaging surfaces of right and left cameras 21 and 22 of the stereo camera 20, the positions of an object are shifted by a parallax D. In the stereo camera 20, processing for matching the feature points (edges and the like) in two captured images is performed to calculate the parallax D. A triangle (solid line) having an object as its apex and a triangle (dotted line) having a focus as its apex are similar. Assuming that the focal length of the camera is f and the distance between the cameras is B, the distance Z to the object is calculated by $Z=B \times f/D$ using the parallax D. In this manner, the distance to each object in the field of view is measured. The distance data measured by each stereo camera 20 is subjected to data processing in the same manner as in the first embodiment (FIG. 5) to obtain a distance image.

In addition, the stereo camera may be configured to include a light emitting unit for illumination for assisting imaging or a projection unit for projecting a specific pattern image in addition to the pair of cameras for imaging described above.

Also in the third embodiment, a wide detection range can be covered by using an omnidirectional distance measuring device that is formed by integrating a plurality of stereo cameras. In addition, it is not necessary to adjust the detection areas of the plurality of stereo cameras.

While the embodiments of the invention have been described above, the invention is not limited to the embodiments described above, and includes various modification examples. For example, the above embodiments have been described in detail for easy understanding of the invention, but the invention is not necessarily limited to having all the components described above. In addition, some of the components in one embodiment can be replaced with the components in another embodiment, and the components in another embodiment can be added to the components in one embodiment. In addition, for some of the components in each embodiment, addition, removal, and replacement of other components are possible.

What is claimed is:

1. An omnidirectional distance measuring device, comprising:
   a plurality of distance measuring sensors that respectively measure a distance to a target and are disposed radially around a central axis,
   wherein the plurality of distance measuring sensors are integrally configured such that a detection center direction of each of the plurality of distance measuring sensors is inclined by a predetermined angle from a plane perpendicular to the central axis,
   wherein each distance measuring sensor is a stereo camera that includes a pair of cameras that measures a distance to a target using parallax of the pair of cameras,
   wherein each stereo camera has a quadrilateral shape having parallel first sides longer than parallel second sides, and
   wherein each stereo camera is arranged such that a second side of one stereo camera faces and is parallel with a first side of an adjacent stereo camera.

2. The omnidirectional distance measuring device according to claim 1, wherein the number of the plurality of distance measuring sensors is set such that a sum of fields of view (FOV) is approximately the same as an angle corresponding to a measurement area.

3. The omnidirectional distance measuring device according to claim 2,
wherein the number of the plurality of distance measuring sensors is four when the FOV of each of the plurality of distance measuring sensors is approximately 90 degrees and the angle corresponding to the measurement area is 360 degrees.

4. The omnidirectional distance measuring device according to claim 1, further comprising:
a housing for positioning and integrally holding the plurality of distance measuring sensors,
wherein the plurality of distance measuring sensors are housed so as to be attachable and detachable with respect to the housing.

5. The omnidirectional distance measuring device according to claim 1, further comprising:
a data processing unit that performs signal processing of the plurality of distance measuring sensors; and
a power supply unit that supplies electric power to the plurality of distance measuring sensors,
wherein at least one of the data processing unit and the power supply unit is shared by the plurality of distance measuring sensors, and
the data processing unit and the power supply unit that are shared are disposed in a central portion of the omnidirectional distance measuring device.

6. The omnidirectional distance measuring device according to claim 1, further comprising:
a housing for positioning and integrally holding the plurality of light emitting units,
wherein an outer shape of the housing is approximately circular, and
wherein the plurality of light emitting units are arranged at approximately equal intervals around the housing.

* * * * *